May 9, 1967 G. C. BROMANDER ET AL 3,318,158
CONSTANT ENERGY PULSE GENERATING APPARATUS
Filed Aug. 30, 1963 3 Sheets-Sheet 3

INVENTORS
GAYLE C. BROMANDER
HOWARD E. JONES
BY
Roger W. Hinsen
ATTORNEY

United States Patent Office 3,318,158
Patented May 9, 1967

3,318,158
CONSTANT ENERGY PULSE GENERATING
APPARATUS
Gayle C. Bromander, New Brighton, Minn., and Howard E. Jones, Largo, Fla., assignors to Honeywell Inc., a corporation of Delaware
Filed Aug. 30, 1963, Ser. No. 305,635
12 Claims. (Cl. 73—517)

This invention relates to pulses producing apparatus and more specifically to apparatus for producing pulses having a constant energy therein.

In the present state of the art, digital systems are becoming more prominent than analog systems, especially where any computing apparatus is utilized, because of their greater degree of accuracy and ease of operation. In systems where pulses are utilized to energize forcing systems or provide any other type of mechanical movement, the number of pulses applied to the mechanical apparatus are generally counted and utilized to indicate the amount of movement or force applied. One of the major areas of error in these systems is the production of pulses having a constant energy.

In prior art devices the pulses applied to the mechanical apparatus are filtered to provide an average D.C. voltage and this average D.C. voltage is compared to a D.C. reference voltage. The difference between the two D.C. voltages is applied to control the output of a power amplifier or modulator. A reference excitation supply or oscillator having the desired frequency output is connected to the input of the power amplifier. Thus, the output of the oscillator is amplified by the power amplifier to an amplitude controlled by the difference voltage from the comparator. The pulses from the power amplifier are then applied to the mechanical apparatus, which closes the loop.

In the prior art device explained, the energy in the output pulses is directly dependent upon the accuracy of both the oscillator and the D.C. reference. Also, because there are two independent references, unless the filtering circuit which converts the pulses from the load circuit to a D.C. voltage is extremely accurate, it is possible to have no change in the average energy even though the reference oscillator is varying considerably. Thus, to provide accurate pulses, the prior art devices have to utilize extremely accurate circuits and components.

In the present invention the pulses applied to the load circuit, after passing through the load circuit, are filtered to provide a varying D.C. current and this current is applied to a current to frequency converting means. The output signal of the current to frequency converting means is then applied to a phase comparing means. A second input to the phase comparing means is supplied by a reference frequency source. The difference in phase between the two signals applied to the comparing means then appears as a D.C. signal on the output of the comparing means. This D.C. signal is applied to control a modulator. The output of the reference frequency source is also applied to the modulator and the D.C. signal from the comparing means controls the amplitude of the signal produced by the modulator. The signal from the modulator may then be amplified by an amplifier having fixed amplification and the pulses are applied to the load circuit, which completes the loop. Since these pulses will in general be sinusoidal signals, a variation in the previously explained apparatus is to apply only the positive or the negative half-cycle pulses to the load circuit and filter the other half-cycle pulses to indicate the amount of energy being applied to the load circuit.

The present invention has a great advantage over prior art devices in that a single reference frequency source is utilized to maintain the energy in the pulses constant. Also, since the D.C. current representing the average energy applied to the load circuit is converted to a frequency and compared to the reference frequency source, it is clear that any variations in the reference frequency source will immediately effect the overall circuit and be compensated. Thus, the energy in the pulses can be controlled to a very precise accuracy. Since the energy in each pulse and the frequency of the pulses can be accurately controlled, the present device can be utilized as an extremely accurate power supply also. It should be noted that the reference frequency source of the present invention could be used simply to start the loop functioning if the frequency converting means were exactly linear. However, as the linearity of the converting means decreases the accuracy of the reference source must increase to maintain the desired overall accuracy. These major advantages and many others will be more clearly set forth in the following explanation, figures and claims.

Accordingly, it is an object of this invention to provide an improved control apparatus.

It is a further object of this invention to provide an improved constant energy pulse producing apparatus.

These and other objects of the invention will become apparent from the following description of a preferred form thereof and the accompanying specification, claims and drawings, of which:

Figure 1:
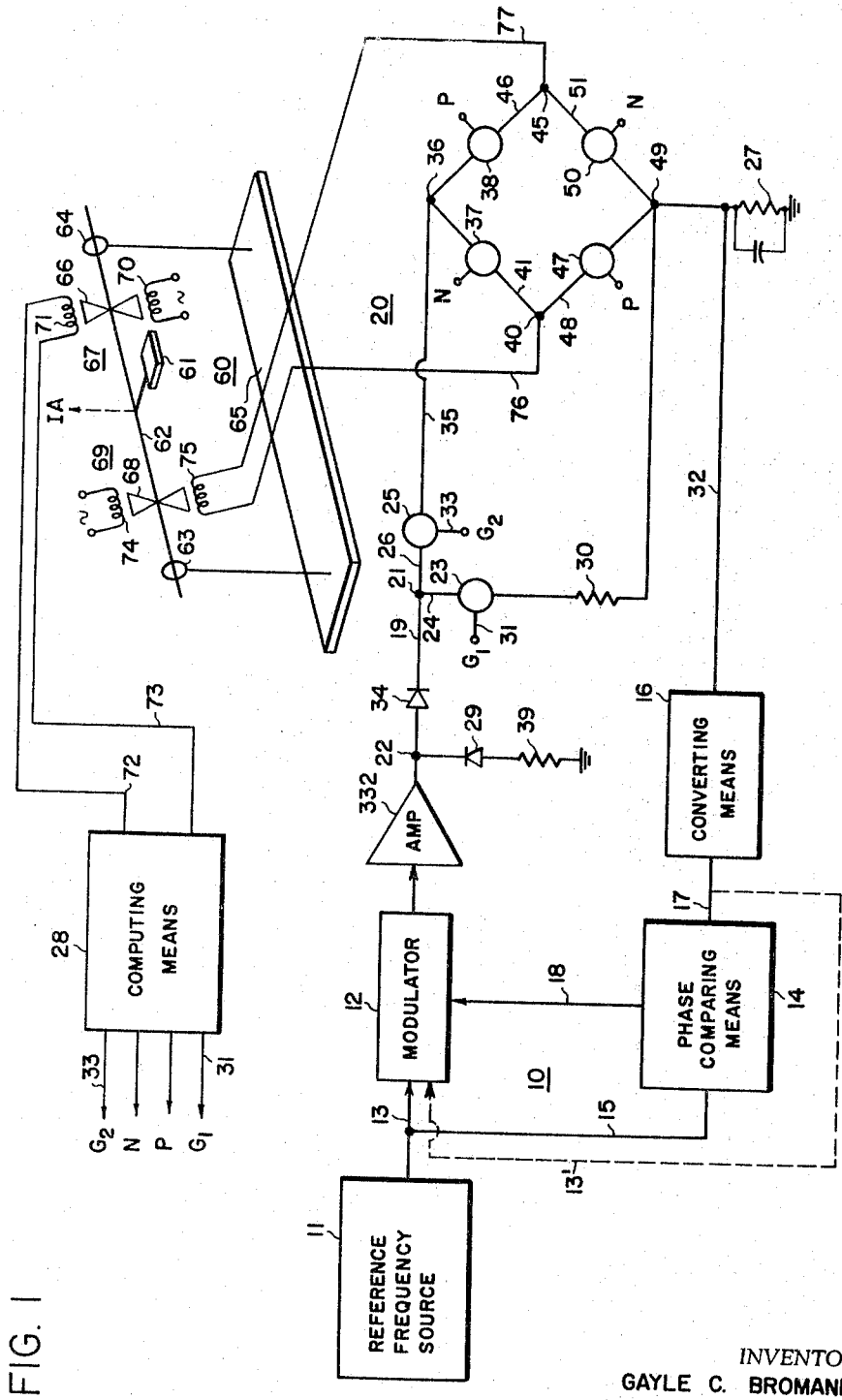
FIGURE 1 is a block diagram of a pulse rebalance system for an inertial instrument.

FIGURE 1 represents a pulse rebalance system having constant energy pulse producing apparatus generally indicated by the numeral 10. The constant energy pulse producing apparatus is primarily stabilized by a reference frequency source 11, which may be an oscillator such as a crystal oscillator or it may be the clock of the computer to which the pulses are applied in a manner to be described later. The signal from the reference frequency source 11 is applied to a modulator 12 by a lead 13 and to a phase comparing means 14 by a lead 15. The phase comparing means 14 receives a second signal from a converting means 16 on a lead 17. Phase comparing means 14 compares the phase of the signals on leads 15 and 17 and provides a signal on a lead 18 which is indicative of the amount the two input signals are out of phase. The operation of the phase comparing means 14 can be more fully understood from a description of the schematic shown in FIGURE 2.

Figure 2:
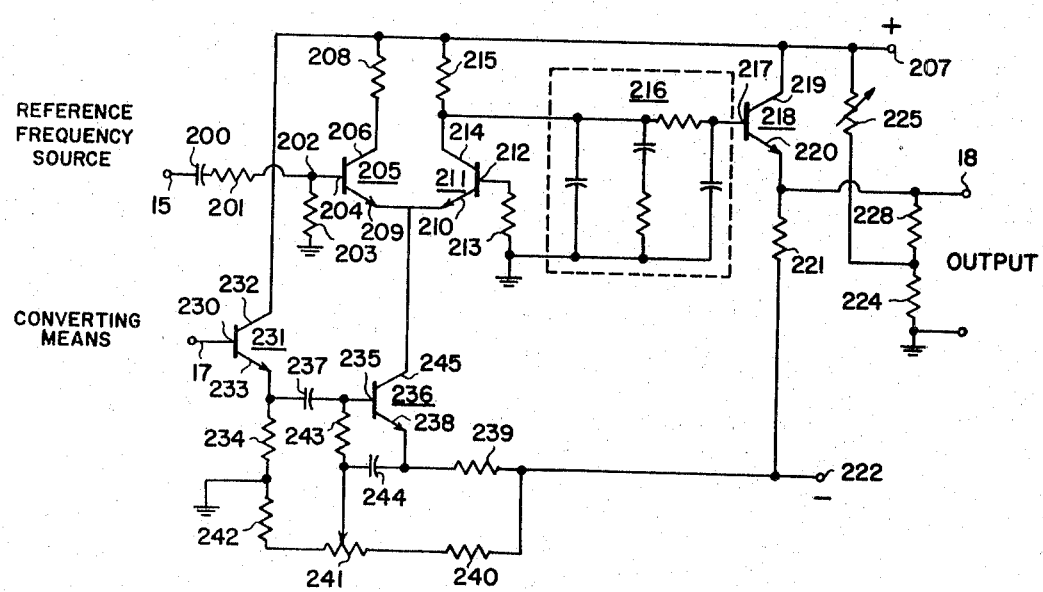
FIGURE 2 is a schematic of the modulator.

In FIGURE 2 the numeral 14 generally designates the phase comparing means which in this schematic is a phase discriminator but may be any of a variety of phase comparing means. The numeral 15 designates the lead upon which the signal from the reference frequency source is received and the numeral 17 designates the lead upon which the signal from the converting means is received. The signal on lead 15 is applied through a decoupling capacitor 200 and a resistor 201 to a junction point 202. A resistor 203 is connected from junction point 202 to ground, and forms a voltage divider network with resistor 201. Also connected to junction point 202 is a base 204 of a transistor 205. Transistor 205 has a collector 206 connected to a positive power supply, indicated by the terminal 207, through a resistor 208. An emitter 209 of transistor 205 is connected to an emitter 210 of a second transistor 211. A base 212 of transistor 211 is connected to ground through a resistor 213, and a collector 214 is connected to the positive power supply 207 through a resistor 215.

The collector 214 of transistor 211 is connected through a filter and compensation network generally designated by the numeral 216 to a base 217 of a transistor 218. A collector 219 of transistor 218 is connected directly to the positive power supply 207 and an emitter 220 is connected through a resistor 221 to a negative power supply represented by the terminal 222. An output signal of the phase discriminator circuit 14 appears on a lead 18 which is connected directly to the emitter 220 of transistor 218. A voltage divider network consisting of a pair of resistors 223 and 224 connected between the emitter 220 of transistor 218 and ground and a variable resistor 225 connected between the junction point between the first pair of resistors and the positive power source 207 provides a means for regulating the lower limit of the output signal.

A second signal from the converting means on lead 17 is applied directly to a base 230 of a transistor 231. A collector 232 of transistor 231 is connected directly to the positive power supply 207 and an emitter 233 is connected through a resistor 234 to ground. A base 235 of a second transistor 236 is connected to the emitter 233 of transistor 231 through a decoupling capacitor 237. An emitter 238 of transistor 236 is connected to the negative power supply 222 through a resistor 239. A voltage divider circuit consisting of a resistor 240, a variable resistor 241 and a resistor 242 in series is connected between the negative power supply 222 and ground. The movable arm of variable resistor 241 is connected to the base 235 of transistor 236 through a resistor 243. The movable arm of variable resistor 241 is also connected to the emitter 238 of transistor 236 by a filter capacitor 244. The voltage divider circuit in conjunction with resistor 243 forms a variable bias network which upon being properly set establishes the correct operating point of the circuit when the two input frequencies are in phase. A collector 245 of transistor 236 is connected to the emitters 209 and 210 of transistors 205 and 211.

In the operation of the phase discriminator circuit, transistors 205 and 211 are switched in accordance with the reference frequency applied on lead 15. Transistors 231 and 236 operate as amplifiers. The signal appearing on lead 17 is essentially a constant amplitude square wave with a variable frequency. The signal on lead 17 causes transistor 236 to conduct more or less current. The manual setting of potentiometer 241 establishes the central voltage of the phase discriminator circuit output. As the constant amplitude square wave on lead 17 causes transistor 236 to conduct more or less current, the reference frequency signal switches transistors 205 and 211 to provide an output signal on lead 18 from transistor 218. This output signal is essentially a linear function of the phase difference between the signals on leads 15 and 17 and will vary about the bias voltage established by potentiometer 241. It should be noted that a nonvariable resistor could replace potentiometer 241 once the operating value has been established. It is necessary that the output signal of the phase discriminator circuit vary about a bias voltage since the signal applied to the modulator 12 of this embodiment must have some value other than zero. The value of the bias voltage is determined by the output signal necessary to provide the desired magnitude of pulse from the modulator when the input signals on leads 15 and 17 are in phase.

Figure 3:
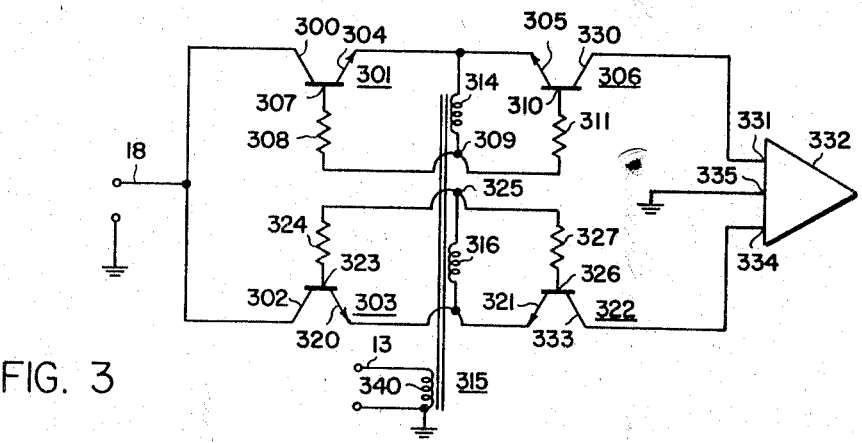
FIGURE 3 is a schematic diagram of a phase discriminator.

In FIGURE 3, the modulator circuit which receives the output signal from the phase discriminator circuit on lead 18 and an output signal from the reference frequency source on lead 13 is shown in schematic form. The signal on a lead 18 is applied to a collector 300 of a first transistor 301 and a collector 302 of a second transistor 303. An emitter 304 of transistor 301 is connected directly to an emitter 305 of a transistor 306. A base 307 of transistor 301 is connected to a resistor 308 which is connected to a junction joint 309. A base 310 of transistor 306 is connected to a resistor 311 the other side of which is connected to junction point 309. A secondary winding 314 of a transformer generally designated 315 is connected between the junction point 309 and the interconnected emitters 304 and 305. An emitter 320 of transistor 303 is connected directly to an emitter 321 of a transistor 322. A base 323 of transistor 303 is connected to a resistor 324 the other side of which is connected to a junction point 325. A base 326 of transistor 322 is connected to a resistor 327 the other side of which is connected to a junction point 325. A secondary winding 316 of transformer 315 is connected between junction point 325 and the interconnected emitters 320 and 321. A collector 330 of transistor 306 is connected to a first input 331 of an amplifier 332. A collector 333 of transistor 322 is connected to a second input 334 of amplifier 332. Signals appearing on the collectors 330 and 331 are applied to amplifier 332 between terminals 331 and a terminal 335, which is grounded, and terminal 334 and 335 respectively. Amplifier 332 may be any amplifier, for example, a differential amplifier, which will provide the required amplification of the two signals applied thereto. The signals from the reference frequency source are applied to a primary winding 340 of transformer 315 between an input lead 13 and ground.

In the operation of the modulator circuit, whenever the signal from the reference frequency source on lead 13 is positive with respect to ground, the voltage induced into the secondary winding 314 causes the emitters 304 and 305 of transistors 301 and 306, respectively, to be negative with respect to the bases 307 and 310. Thus, any signal appearing on the input lead 18 from the phase discriminator circuit will pass through both conducting transistors 301 and 306 to the input 331 of amplifier 332. However, the voltage induced in the secondary winding 316 is such as to cause transistors 303 and 332 to be nonconducting and no signal passes therethrough. When the signal from the reference frequency source on lead 13 is negative with respect to ground, the voltage induced in the secondary 316 causes the emitters 320 and 321 to be negative with respect to the bases 323 and 326, and transistors 303 and 322 are both in a conducting state. Thus, any signal appearing on lead 18 from the phase discriminator circuit will pass through both transistors to the input 334 of the amplifier 332. When the signal on lead 13 is negative, the voltage induced in the secondary 314 causes transistors 301 and 306 to be nonconducting and no signal from the lead 18 passes therethrough. It should be noted that while the extreme conducting and nonconducting conditions of the transistors have been explained, any amount of conduction, from nonconduction to saturation, can be obtained by simply increasing the amplitude of the signal on lead 13. Thus, a modulator has been described which provides an output having a frequency dependent upon the reference frequency source output signal at lead 13 and an amplitude dependent upon the phase discriminator signal at lead 18. The described circuit is simply one embodiment that may be utilized and one skilled in the art could think of many modifications which are within the scope of the invention.

Refering to FIGURE 1, the output of the amplifier 332 is connected to a load circuit which in this embodiment is a switching bridge circuit, generally designated by the numeral 20, by a lead 19. The output of the amplifier 332 is connected to a junction point 22. A rectifier 29 is connected from junction point 22 to ground so that the negative half cycles of the waveform appearing at the output of amplifier 332 are shorted to ground through a resistor 39. A second rectifier 34 is connected between junction point 22 and a second junction point 21 by a lead 19 so that it passes all of the positive half cycles of the waveform appearing at the output of amplifier 322. A switch 23 is connected to junction point 21 by means of a lead 24. A switch 25 is connected to junction point 21 by means of a lead 26. Switch 23 when closed connects one side of a dummy load shown as an impedance 30 to junction point 21 and the other side of impedance 30 is connected to ground through a filter circuit means, which in this embodiment is illustrated simply as a resistor and capacitor circuit 27. The activation of switch 23 is controlled by a signal which is supplied to the switch by means of a lead 31. Lead 31 receives this signal from computing means designated numeral 28. The lead 31 is not completed in FIGURE 1 for simplification of the drawings but is simply indicated as being connected to the output $G_1$, which is also indicated with the numeral 31, at the computing means 28. The activation of switch 25 is controlled by a signal applied to the switch by means of a lead 33. Lead 33 receives this activating signal from the computing means 28. The lead is not completed in FIGURE 1 but the connection is indicated by the designation $G_2$ at the switch 25 and at the output 33 of the computing means 28. When the signal on lead 31 closes switch 23, the signal on lead 33 opens switch 25. Switch 25 when activated connects lead 26 to a lead 35 which is connected to a junction point 36. Junction point 36 is connected directly to a first switch 37 and to a second switch 38. Switch 37 when activated connects junction point 36 to a junction point 40 by means of a lead 41. Switch 38 when activated connects junction point 36 to a lead 46 which is connected to a second junction point 45. Another switch 47 is connected to junction point 40 by means of a lead 48. When activated, switch 47 connects lead 48 to a junction point 49. Another switch 50 is connected to junction point 45 by means of a lead 51. When activated, switch 50 connects lead 51 to the junction point 49. Junction point 49 is connected to ground through the filtering circuit 27.

In FIGURE 1, the numeral 60 generally designates an inertial instrument, which in this particular embodiment is a pendulous accelerometer, shown schematically. Pendulous accelerometer 60 consists of a pendulous weight 61, fixedly attached to a shaft 62. Shaft 62 is supported for rotation by some bearing means 63 and 64 which are fixedly attached to a case 65 of accelerometer 60. An input axis IA is mutually perpendicular to the pendulous weight 61 and the rotatable shaft 62. A rotor 66 of a signal generator 67 is fixedly attached to shaft 62 and rotates therewith. A rotor 68 of a torque generator 69 is also fixedly attached to shaft 62 and rotates therewith. An excitation winding 70 of signal generator 67 is adapted to have an excitation voltage applied thereto. Upon proper excitation of winding 70 any movement of rotor 66 from the null position induces a signal into a pickoff winding 71 which is applied to computing means 28 by means of a pair of leads 72 and 73. A pattern field winding 74 of torque generator 69 is adapted to have a voltage applied thereto. A second winding 75 of torque generator 69 is the excitation winding. If the pattern field winding 74 is properly energized and an excitation signal appears on winding 75, a force is produced on rotor 68 which produces rotation of rotor 68 and shaft 62 in the desired direction. Excitation winding 75 of torque generator 69 is connected between junction points 40 and 45 of the switching bridge circuit 20 by means of a pair of leads 76 and 77.

Switch 37 of switching bridge 20 is activated by a signal on a lead designated N. The lead designated N is actually a connection to computing means 28 which has a similar lead designated N. This connection and similar connections to be explained have not been shown for simplification of FIGURE 1. Switch 50 is actuated simultaneously with switch 37 when a signal appears on lead N. Switches 38 and 47 are activated simultaneously when a signal appears on a lead P. The lead P is also a connection to computing means 28. The computing means 28 may be any compilation of gating circuits and flip-flops which provide a signal on $G_1$ and $G_2$ which opens switch 25 when switch 23 is closed and opens switch 23 when switch 25 is closed. Also, when switch 23 is open and switch 25 is closed, the computing means 28 must provide a signal either on the N lead or the P lead, but not both. Which switches will be activated is controlled by the magnitude and polarity of the signal appearing on leads 72 and 73.

When the pendulous weight 61 of accelerometer 60 is in the null position, that is, no acceleration along the axis IA, no signal is induced in secondary winding 71 of signal generator 67 and computing means 28 provides a signal on lead 31 ($G_1$) which closes switch 23. A signal is simultaneously provided on lead 33 ($G_2$) which opens switch 25. Thus, the positive pulses of current appearing at junction point 21 travel through switch 23, dummy load 30 and the filtering circuit 27 to ground. If an acceleration appears along the IA axis in an upward direction, pendulous weight 61 has a force applied thereto and causes rotation of shaft 62 and, therefore, rotor 66 in a clockwise direction, looking from bearing means 63 to bearing means 64. The rotation of rotor 66 induces a signal into secondary winding 71 which is applied to computing means 28. Computing means 28 provides a signal on lead $G_1$ which opens switch 23 and, simultaneously, provides a signal on lead $G_2$ which closes switch 25. Computing means 28 also provides a signal on lead N which closes switches 37 and 50 and simultaneously provides a signal on lead P which opens gates 38 and 47. Thus, the pulses appearing at junction point 21 travel through switch 25, switch 38, excitation winding 75 of torque generator 69, switch 47, and filter resistor 27 to ground. The current passing through excitation winding 75 is travelling in the opposite direction in the second example and thus produces a rotation of rotor 68 and shaft 62 in the opposite direction. Therefore, by applying the proper amount of the pulses appearing at junction point 21 to the excitation winding 75 of torque generator 69 and by applying these pulses in the proper direction, a torque on shaft 62 is produced which will maintain the pendulous mass 61 at the null position.

Figure 5:
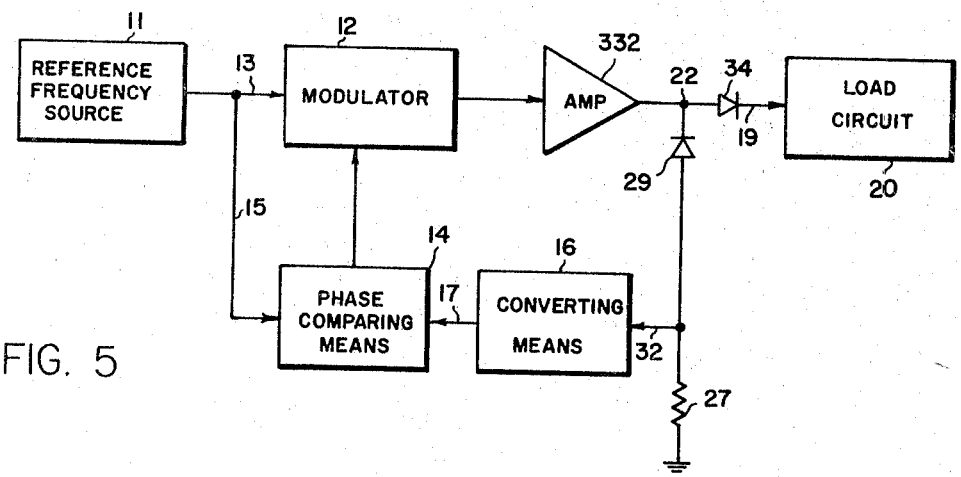
FIGURE 5 is another embodiment of the present invention.

All of the pulses appearing at junction point 21 pass through the filter resistor 27 to ground, whether they travel by way of the dummy load resistor 30 or the excitation winding 75 of torque generator 69. Thus, the filter circuit 27 has a voltage appearing across it which is indicative of the average energy in the pulses appearing at the junction point 21. It should be noted that an alternate embodiment of this system might be to connect junction point 49 and impedance 30 directly to ground. Then, as shown in FIGURE 5, the filtering circuit 27 is placed between rectifier 29 and ground and lead 32 is connected between diode 29 and filtering circuit 27. In this embodiment the signal on lead 32 is an indication of the average energy content of the negative pulses. However, since the negative pulses vary the same as the positive pulses, any variations in energy content of the positive pulses would be compensated in a fashion similar to that explained for the previous embodiment. In FIGURE 1, the voltage appearing across the filter circuit 27 is applied to the input of converting means 16 by a lead designated 32. Converting means 16 is a device which produces an accurate output frequency indicative of the variations of an input signal. Converting means 16 may be a device such as a voltage controlled oscillator or a nuclear magnetic resonance current to frequency converting device.

Figure 4:
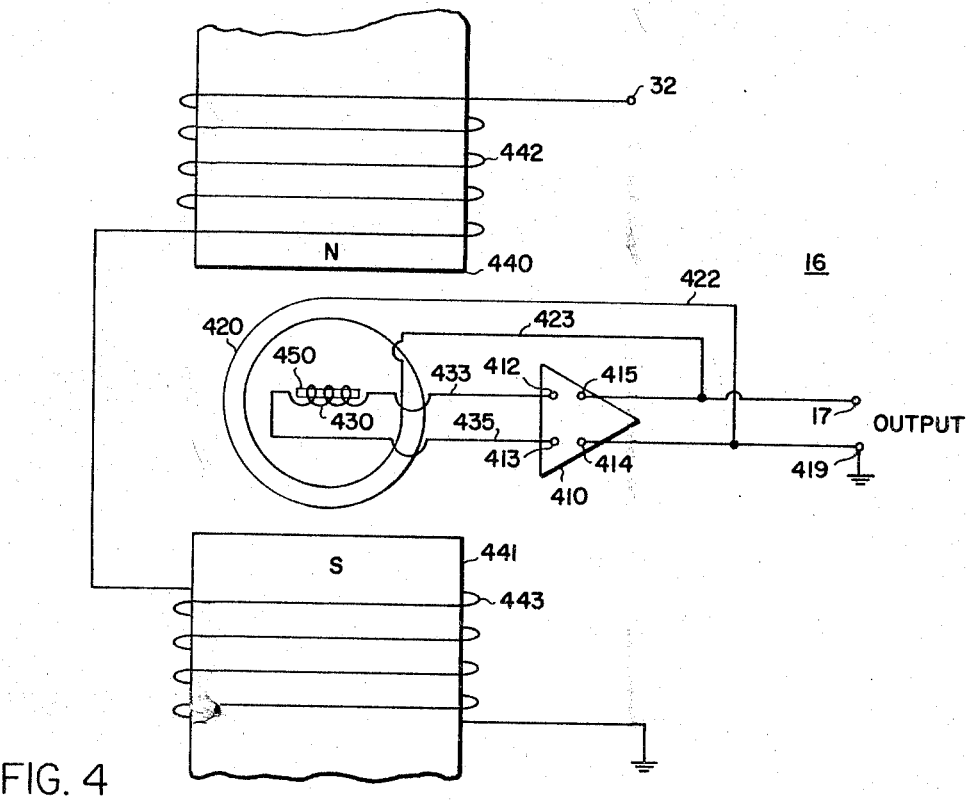
FIGURE 4 is a schematic diagram of a nuclear magnetic resonance spin oscillator.

A complete explanation of the NMR principles can be found in a patent Re. 23,950 issued to F. Bloch et al. on Feb. 22, 1955. A suitable current to frequency converting device for use in the present invention is disclosed in a copending application Ser. No. 135,219, filed Aug. 31, 1961, in the name of Barrett Doyle and assigned to the same assignee. A somewhat simplified version of an NMR current to frequency converting means is illustrated in FIGURE 4. Referring to FIGURE 4, an NMR spin generator generally designated 16 is illustrated. In the NMR spin generator a first winding means 420 is comprised of a single cylindrical coil with a comparatively large diameter. This coil is mounted, by means not shown, along a first axis which is perpendicular to the plane of the paper. A first winding means 420 is connected to a pair of output terminals 414 and 415 of an amplifier 410 by means of a pair of leads 422 and 423. Thus, winding means 420 is energized by any output from amplifier 410 and is in effect an alternating magnetic field producing means. Output means for the complete device are depicted by a terminal 17 and a grounded terminal 419. Terminal 17 is connected to terminal 415 of amplifier 410 and a terminal 419 is connected to terminal 414 of amplifier 410.

A second winding means or sensing means 430 is mounted, by means not shown, within the aperture of the winding means 420 in an orthogonal relationship so that substantially no voltage will be induced directly from coil 420 to coil 430. Coil 430 is connected to a pair of input terminals 412 and 413 of amplifier 410 by a pair of leads 433 and 435. A means of producing a varying magnetic field consists of a first magnetic pole 440 and a second magnetic pole 441. The poles 440 and 441 are mounted, by means not shown so that a unidirectional field is set up along an axis mutually perpendicular to the axes of coils 420 and 430. Poles 440 and 441 are further mounted so that winding means 430 is approximately centrally located there between. This is to insure as uniform a magnetic field as possible across the entire coil 430. A first winding 442 is distributed about pole 440 to induce a magnetic flux therein. A second winding 443 is distributed about pole 441 to induce a magnetic flux therein. Windings 442 and 443 are connected in series and current is applied thereto by means of an input lead 32 and a ground connection. Windings 442 and 443 are wound so that pole 440 is a north pole at the same time that pole 441 is a south pole. Thus, any signal appearing on lead 32 produces a magnetic field which varies in accordance with the magnitude of the input signal, between poles 440 and 441.

A sample 450 is placed within the winding means 430. Sample 450 is comprised of a dimagnetic material or some material with atoms having nuclei with non-zero magnetic moments. The nuclei of the atoms in sample 450 may be thought of as spinning bar magnets. When a magnetic field is applied to sample 450 by some means such as magnetic poles 440 and 441, the nuclei of the atoms in sample 450 tend to react as bar magnets and eventually align with the magnetic field. However, because of the spin or magnetic moment of the nuclei, a gyroscopic action occurs and the nuclei precess about their precession axes. When enough nuclei become aligned a voltage will be induced in winding means 430. The magnitude of this induced voltage will depend upon the amount of precession and the number of nuclei aligned. This induced voltage will be an alternating voltage and the frequency will be dependent upon the magnitude of the magnetic field and the type of material used in sample 450. This voltage is applied to the amplifier 410 and the amplified voltage is then applied to the winding means 420 by means of leads 422 and 423.

The voltage from amplifier 410, which is alternating at the precession frequency of the nuclei of sample 450, is utilized to energize winding means 420. Since winding means 420 is energized at the precession frequency of the nuclei it produces an alternating magnetic field, and this field is perpendicular to the unidirectional magnetic field produced by magnetic poles 440 and 441. This alternating magnetic field adds to the precession of the nuclei vectorially causing them to precess farther. The alternating magnetic field may be thought of as giving the nuclei a push at just the proper moment to cause them to precess farther. As the nuclei precess farther, a larger voltage is induced in winding means 430 which is amplified by amplifier 410 and applied to winding means 420 causing the alternating magnetic field to become stronger. This increase of induced energy continues until the nuclei reach a maximum point or until a time at which the losses in the circuit just equal the energy applied.

Since the precession frequency of the nuclei is dependent upon the magnetic field produced by poles 440 and 441 and the variations of flux density in these poles is in turn induced by windings 442 and 443, it can be seen that any variations in the input current applied to lead 32 will produce variations in the output frequency at lead 17. The variations in the output frequency are a direct indication of the variations in the input current. Also, since the characteristic precession of the nuclei is a very precise characteristic for any given substance the conversion from the current appearing at lead 32 to the frequency appearing at lead 17 in this device will be extremely accurate.

Any changes in the energy content of the pulses passing through the filter resistor 27 cause a corresponding change in the magnetic field in the converting means 16 which produces a corresponding change in the output frequency at lead 17. The change in the frequency appearing on lead 17, when compared to the frequency from the reference frequency source on lead 15 in the phase comparing means 14, causes the comparing means 14 to produce a signal on lead 18. The change in the signal on lead 18 produces a change in the signal passing through amplifier 332 which counteracts the change in energy content of the pulse detected by converting means 16 acting in conjunction with filtering circuit 27.

For example, assume that the frequency output on lead 13 from reference frequency source 11 should suddenly increase. This increase in frequency is transmitted through modulator 12 and the pulses appearing at junction 21 have a higher frequency but a smaller energy content since the amplitude of the pulses has not been changed. This decrease in energy is detected by filtering circuit 27 and the signal applied to converting means 16 on lead 32 will cause the output frequency on lead 17 to go down. Since the frequency on lead 17 is now lower than the frequency on lead 15, the phase comparing means 14 will detect a phase shift and provide a signal on lead 18 of a larger magnitude than before. This increase in the magnitude of the signal applied to modulator 12 on lead 18 will cause the pulses appearing at junction point 21 to have the same energy content as before. Thus, a constant energy pulse producing apparatus is provided.

It should be noted that the signal dictating the frequency of the output of the modulator has been explained as coming from the reference frequency source 11 on lead 13. However, this signal could also be obtained from the converting means 16. This connection is indicated by dotted line 13' which can take the place of lead 13. The signal can be taken from converting means 16 since the frequency around the entire loop must be the same. That is, when the frequency on lead 17 differs from the frequency on lead 15, a signal is produced on lead 18 to make them equal. In actual practice, this process is continuous and the signal on lead 18 keeps them equal.

In the present circuitry if a converting means 16 is utilized which is exactly linear the reference frequency source 11 is simply a device to start the circuit operating. Conversely when the reference frequency source 11 is a very accurate source the converting means 16 can be nonlinear and the apparatus will still operate properly, since the reference frequency source forces the loop to operate at one frequency. Thus, the present invention utilizes one reference or accurate circuit and the remainder of the circuits are held to the desired accuracy by the reference circuit.

Since the present invention has a single reference frequency source the circuitry disclosed is greatly simplified relative to the prior art. A wide variety of very precise converting means 16 may be utilized to greatly increase the accuracy of the present invention. Also, this accuracy is increased because of the fact that the present invention can operate at relatively high voltage levels because the phase of two signals is being compared to provide an error signal, whereas the prior art devices compare extremely low voltage levels to provide an error signal.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. Constant energy pulse producing apparatus comprising:
   (a) a reference frequency source providing an output signal;
   (b) current to frequency converting means providing an output voltage the frequency of which varies in accordance with a current applied thereto;
   (c) a phase discriminator connected to receive said signal from said reference frequency source and said output voltage from said converting means, and providing an output which is indicative of the difference in phase therebetween;
   (d) a modulator connected to receive said output from said phase discriminator and said signal from said reference frequency source, said modulator providing output current pulses at the frequency of said signal, said output current pulses being modulated by said output from said phase discriminator;
   (e) a load circuit connected to receive said output current pulses;
   (f) filtering means connected to receive said current pulses from said load circuit and providing a current indicative of the average energy in said current pulses; and
   (g) means connecting said current from said filtering means to said current to frequency converting means.

2. Constant energy pulse producing apparatus comprising:
   (a) a reference frequency source providing an output signal;
   (b) converting means providing an output signal having a frequency which varies in accordance with the magnitude of a signal applied thereto;
   (c) phase comparing means connected to receive said output signal from said reference frequency source and said signal from said converting means, and providing an output which is indicative of the difference in phase therebetween;
   (d) a modulator connected to receive said output from said phase comparing means and said output signal from said reference frequency source, said modulator providing output pulses having constant energy as controlled by said output from said phase comparing means and varying at the frequency of said signal from said reference frequency source;
   (e) a load circuit connected to receive said output pulses from said modulator;
   (f) filtering means connected to said load circuit and providing an output signal indicative of the average energy passing through said load circuit; and
   (g) means connecting said output signal of said filtering means to said converting means.

3. Constant energy pulse producing apparatus comprising:
   (a) a reference frequency source providing an output signal;
   (b) converting means providing an output signal having a frequency which varies in accordance with the magnitude of a signal applied thereto;
   (c) phase comparing means connected to receive said output signal from said reference frequency source and said signal from said converting means, and providing an output which is indicative of the difference in phase therebetween;
   (d) a modulator connected to receive said output from said phase comparing means and said output signal from said reference frequency source, said modulator providing output pulses having constant energy as controlled by said output from said phase comparing means and varying at the frequency of said signal from said reference frequency source;
   (e) a load circuit connected to receive said output pulses from said modulator;
   (f) filtering means connected to receive pulses from said modulator indicative of the energy applied to said load circuit and providing an output signal indicative of the average energy in said pulses applied to said load circuit; and
   (g) means connecting said output signal of said filtering means to said converting means.

4. Constant energy pulse producing apparatus comprising:
   (a) a reference frequency source providing an output signal;
   (b) nuclear magnetic resonance current to frequency converting means providing an output signal having a frequency which varies in accordance with a signal applied thereto;
   (c) phase comparing means connected to receive said output signal from said reference frequency source and said signal from said converting means, and providing an output which is indicative of the difference in phase therebetween;
   (d) a modulator connected to receive said output from said phase comparing means and said output signal from said reference frequency source, said modulator providing output pulses having substantially constant energy as controlled by said output from said phase comparing means and varying at the frequency of said signals from said reference frequency source;
   (e) a load circuit connected to receive said output pulses from said modulator;
   (f) filtering means connected to receive pulses from said modulator indicative of the energy applied to said load circuit and providing an output signal indicative of the average energy in said pulses applied to said load circuit; and
   (g) means connecting said output signal of said filtering means to said current to frequency converting means.

5. A pulse rebalance system comprising:
   (a) a reference frequency source providing an output signal;
   (b) converting means providing an output signal having a frequency which varies in accordance with the magnitude of a signal applied thereto;
   (c) phase comparing means connected to receive said output signal from said reference frequency source and said signal from said converting means, and providing an output which is indicative of the difference in phase therebetween;
   (d) a modulator connected to receive said output from said phase comparing means and said output signal from said reference frequency source, said modulator providing output pulses having substantially constant energy as controlled by said output from said phase comparing means and varying at the frequency of said signals from said reference frequency source;
   (e) a switching bridge circuit connected to receive said output pulses from said modulator;
   (f) filtering means connected to receive pulses from said modulator indicative of the energy applied to said switching bridge circuit and providing an output signal indicative of the average energy in said pulses applied to said switching bridge circuit; and (g) means connecting said output signal of said filtering means to said converting means.

6. A pulse rebalance system comprising:
(a) an inertial sensor having force rebalance means;
(b) a reference frequency source providing an output signal;
(c) converting means providing an output signal having a frequency which varies in accordance with the magnitude of a signal applied thereto;
(d) a phase comparing means connected to receive said output signal from said reference frequency source and said signal from said converting means, and providing an output which is indicative of the phase therebetween;
(e) a modulator connected to receive said output from said phase comparing means and said output signal from said reference frequency source, said modulator providing output pulses having substantially constant energy as controlled by said output from said phase comparing means and varying at the frequency of said signals from said reference frequency source;
(f) means connecting said output pulses from said modulator to said force rebalance means in said inertial sensor in a manner to cause said force rebalance means to rebalance said inertial sensor;
(g) filtering means connected to receive pulses from said modulator indicative of the energy applied to said force rebalance means and providing an output signal indicative of the average energy in said pulses applied to said force rebalance means; and
(h) means connecting said output signal of said filtering means to said converting means.

7. A pulse rebalance system comprising:
(a) an inertial sensor having force rebalance means;
(b) a reference frequency source providing an output signal;
(c) nuclear magnetic resonance current to frequency converting means providing an output signal having a frequency which varies in accordance with a signal applied thereto;
(d) a phase comparing means connected to receive said output signal from said reference frequency source and said signal from said converting means, and providing an output which is indicative of the phase therebetween;
(e) a modulator connected to receive said output from said phase comparing means and said output signal from said reference frequency source, said modulator providing output pulses having substantially constant energy as controlled by said output from said phase comparing means and varying at the frequency of said signal from said reference frequency source;
(f) means connecting said output pulses from said modulator to said force rebalance means in said inertial sensor in a manner to cause said force rebalance means to rebalance said inertial sensor;
(g) filtering means connected to receive pulses from said modulator indicative of the energy applied to said force rebalance means and providing an output signal indicative of the average energy in said pulses applied to said force rebalance means; and
(h) means connecting said output signal of said filtering means to said current to frequency converting means.

8. A constant energy pulse producing apparatus comprising:
(a) a reference frequency source providing an output signal;
(b) converting means providing an output signal the frequency of which varies in accordance with the magnitude of a signal applied thereto;
(c) a phase discriminator connected to receive said signal from said reference frequency source and said output signal from said converting means, and providing an output which is indicative of the difference in phase therebetween;
(d) a modulator connected to receive said output from said phase discriminator and said signal from said reference frequency source, said modulator providing output current pulses at the frequency of said signal, said output current pulses being modulated by said output from said phase discriminator;
(e) rectifying means connected to receive said pulses from said modulator and providing first and second unipolar output pulses;
(f) a load circuit connected to receive said first unipolar output pulses;
(g) filtering means connected to receive said second unipolar output pulses and providing a signal indicative of the average energy content of said second output pulses; and
(h) means connecting said signal provided by said filtering means to said converting means.

9. A pulse rebalance system comprising:
(a) an inertial sensor having force rebalance means;
(b) a reference frequency source providing an output signal;
(c) nuclear magnetic resonance current to frequency converting means providing an output signal having a frequency which varies in accordance with a signal applied thereto;
(d) phase comparing means connected to receive said output signal from said reference frequency source and said signal from said converting means, and providing an output which is indicative of the phase therebetween;
(e) a modulator connected to receive said output from said phase comparing means and said output signal from said reference frequency source, said modulator providing output pulses having substantially constant energy as controlled by said output from said phase comparing means and varying at the frequency of said signal from said reference frequency source;
(f) rectifying means connected to receive said signal from said modulator means and providing first and second unipolar output pulses;
(g) means connecting said first unipolarity output pulses from said rectifying means to said force rebalance means in said inertial sensor in a manner to cause said force rebalance means to rebalance said inertial sensor;
(h) filtering means connected to receive said second unipolarity output pulses from said rectifying means and providing an output signal indicative of the average energy therein; and
(i) means connecting said output signal of said filtering means to said current to frequency converting means.

10. Constant energy pulse producing apparatus comprising:
(a) a reference frequency source providing an output signal;
(b) current to frequency converting means providing an output voltage the frequency of which varies in accordance with a current applied thereto;
(c) a phase discriminator connected to receive said signal from said reference frequency source and said output voltage from said converting means, and providing an output which is indicative of the difference in phase therebetween;
(d) a modulator connected to receive said output from said phase discriminator and said output voltage from said converting means, said modulator providing output current pulses at the frequency of said output voltage, said output current pulses being modulated by said output from said phase discriminator;
(e) a load circuit connected to receive said output current pulses;
(f) filtering means connected to receive said current pulses from said load circuit and providing a current indicative of the average energy in said current pulses; and (g) means connecting said current from said filtering means to said current to frequency converting means.

11. Constant energy pulse producing apparatus comprising:

(a) a reference frequency source providing an output signal;

(b) converting means providing an output signal having a frequency which varies in accordance with the magnitude of a signal applied thereto;

(c) phase comparing means connected to receive said output signal from said reference frequency source and said signal from said converting means, and providing an output which is indicative of the difference in phase therebetween;

(d) a modulator connected to receive said output from said phase comparing means and said output signal from said converting means, said modulator providing output pulses having constant energy as controlled by said output of said phase comparing means and varying at the frequency of said signal from said converting means;

(e) a load circuit connected to receive said output pulses from said modulator;

(f) filtering means connected to said load circuit and providing an output signal indicative of the average energy passing through said load circuit; and (g) means connecting said output signal of said filtering means to said converting means.

12. Constant energy pulse producing apparatus comprising:

(a) a reference frequency source providing an output signal;

(b) converting means providing an output signal having a frequency which varies in accordance with the magnitude of a signal applied thereto;

(c) phase comparing means connected to receive said output signal from said reference frequency source and said signal from said converting means, and providing an output which is indicative of the difference in phase therebetween;

(d) a modulator connected to receive said output from said phase comparing means and said output signal from said converting means, said modulator providing output pulses having substantially constant energy as controlled by said output of said phase comparing means and varying at the frequency of said signal from said converting means;

(e) a load circuit connected to receive said output pulses from said modulator;

(f) filtering means connected to receive pulses from said modulator indicative of the energy applied to said load circuit and providing an output signal indicative of the average energy in said pulses applied to said load circuit; and (g) means connecting said output signal of said filtering means to said converting means.

No references cited.

RICHARD C. QUEISSER, *Primary Examiner.*

J. J. GILL, *Assistant Examiner.*